Dec. 17, 1963  J. P. HAMILTON ETAL  3,114,399
STRAPPING AND SHEARING TOOL
Filed June 27, 1960  4 Sheets-Sheet 1
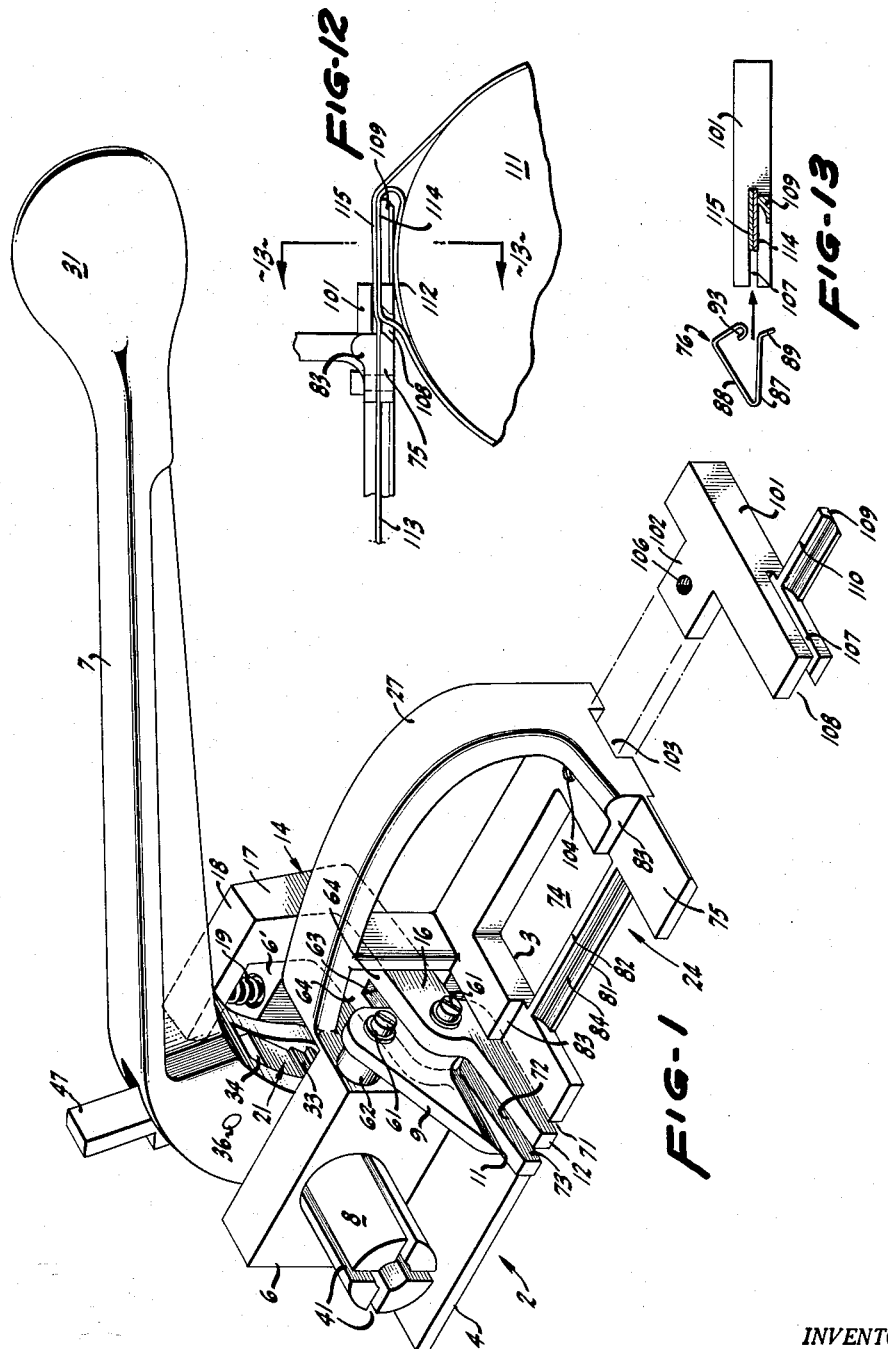
INVENTORS
JOSEPH PORTOLA HAMILTON
GEORGE C. BURKHARDT
BY
ATTORNEY

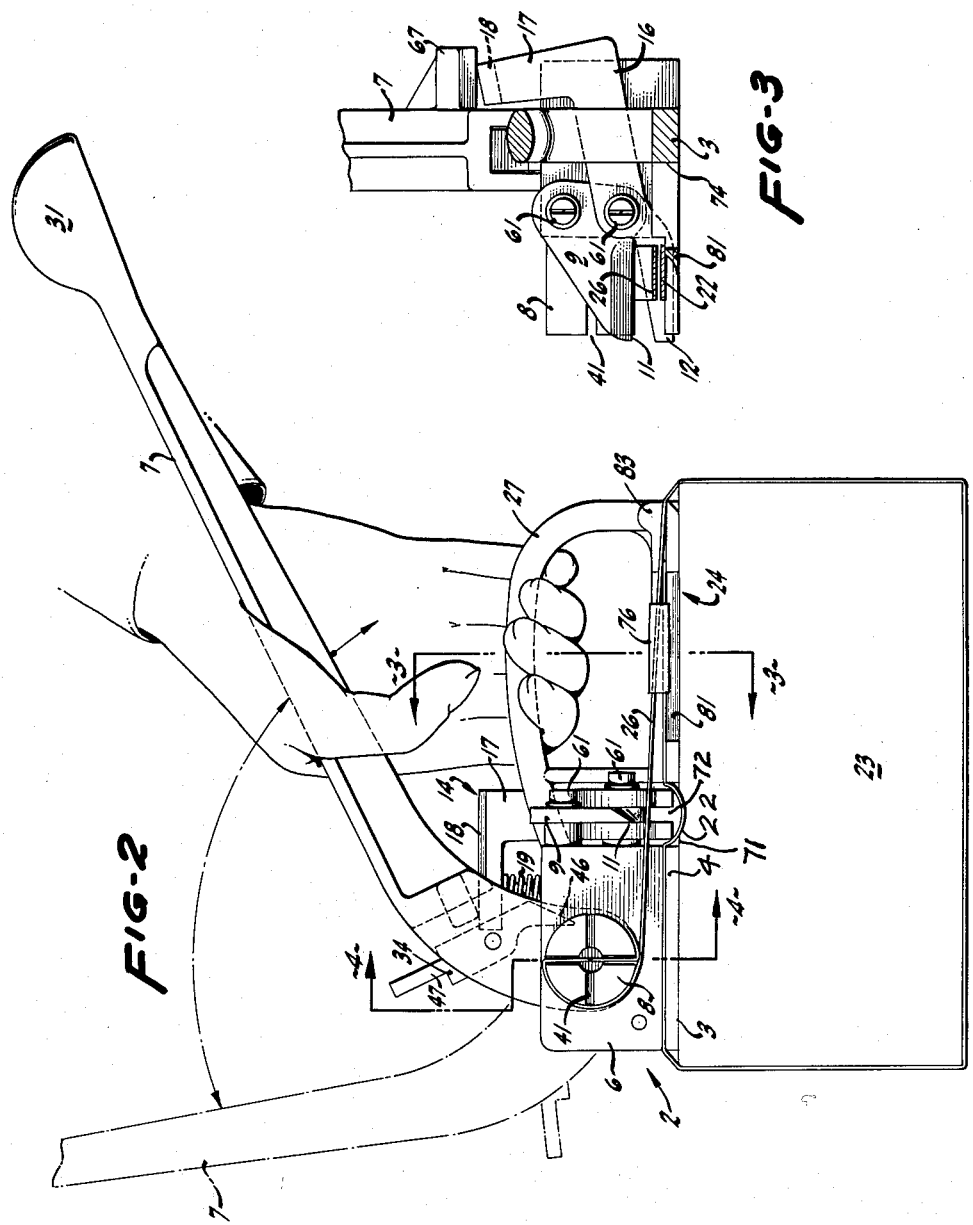

Dec. 17, 1963     J. P. HAMILTON ETAL     3,114,399
STRAPPING AND SHEARING TOOL
Filed June 27, 1960     4 Sheets-Sheet 3
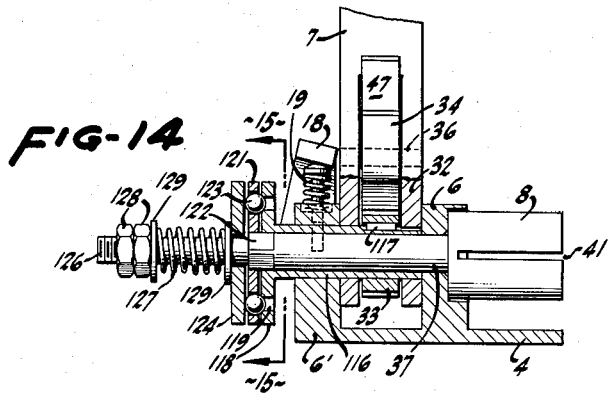
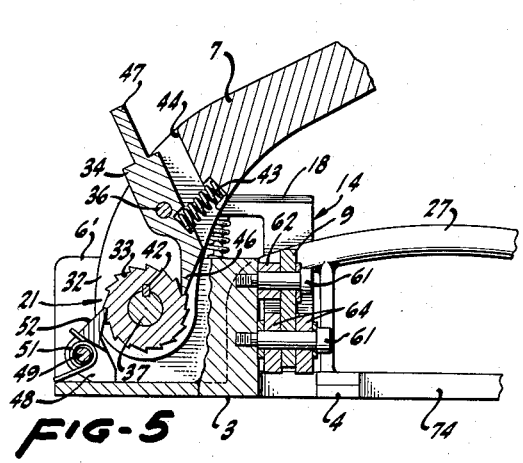
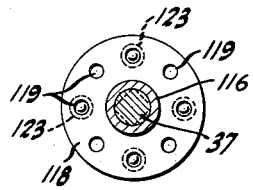
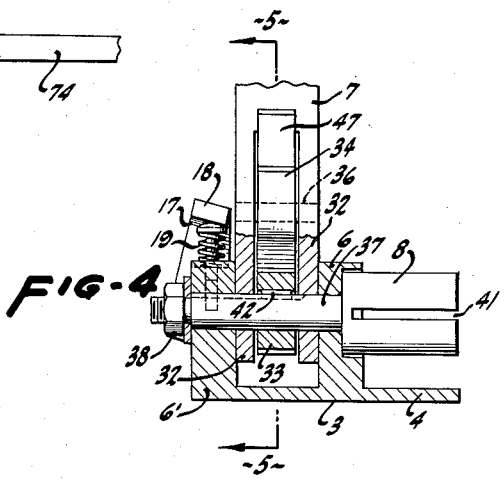
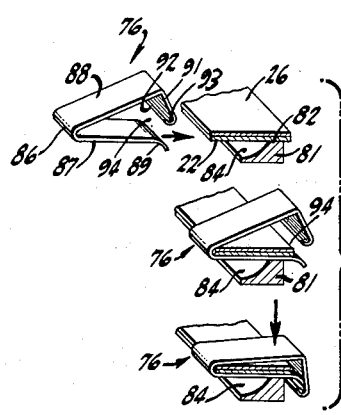
INVENTORS
JOSEPH PORTOLA HAMILTON
GEORGE C. BURKHARDT
BY
*Stanley Bialos*
ATTORNEY Dec. 17, 1963 J. P. HAMILTON ETAL 3,114,399
STRAPPING AND SHEARING TOOL
Filed June 27, 1960 4 Sheets-Sheet 4
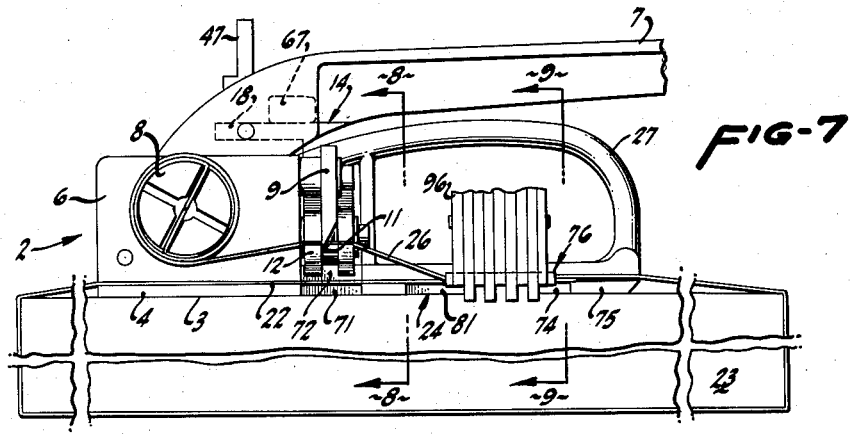
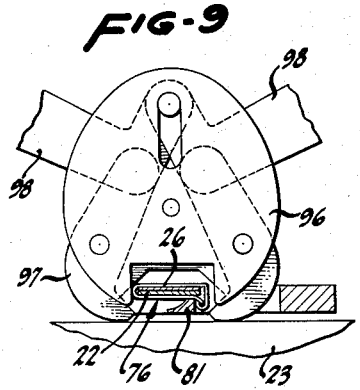
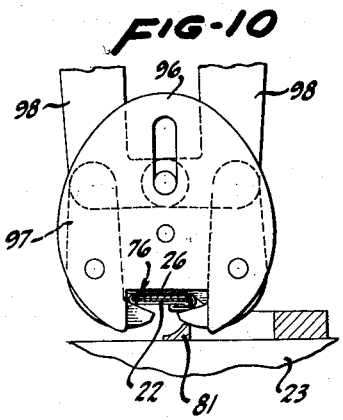
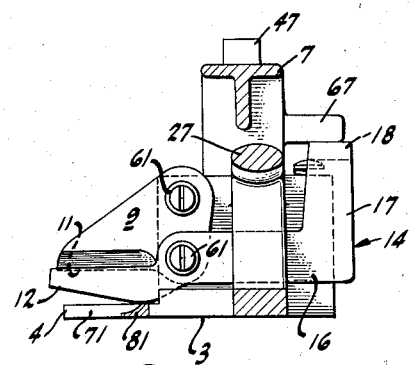
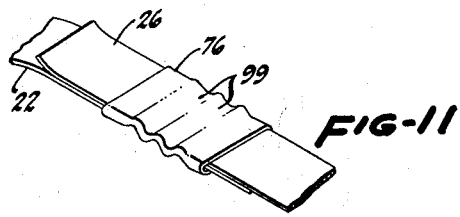
INVENTORS
JOSEPH PORTOLA HAMILTON
GEORGE C. BURKHARDT
BY
ATTORNEY

United States Patent Office 3,114,399
Patented Dec. 17, 1963

3,114,399
STRAPPING AND SHEARING TOOL
Joseph Portola Hamilton, Oakland, and George C. Burkhardt, South San Francisco, Calif., assignors to Zellerbach Paper Company, San Francisco, Calif., a corporation of California
Filed June 27, 1960, Ser. No. 39,061
9 Claims. (Cl. 140—93.2)

This invention relates to a strapping and shearing tool for strapping objects, such as boxes, packages and bundles, and more particularly to a tool for gripping and tightening strap about an object, and shearing the same after the strap has been tightened and sealed by a suitable clip or clamp. The tool hereof is capable of handling various kinds of strip material (hereinafter generically designated as strap) to be bound about an object, and has found particular applicability in the gripping, tightening and shearing of non-metallic strap in the form of a band, such as those formed of paper, synthetic or natural fabrics, and plastics.

Summary and Objects

Summarizing the invention, it has as its objects, among others, the provision of an improved simple and economical strapping method, and tool of the character related wherein a single manually operable handle is provided to control hold down or gripping means for a section of strap, to actuate means to tighten the gripped strap, and to actuate means for effecting shearing or cutting of the strap, which is easy to operate, and which can be used not only for strapping an object having a flat surface upon which the tool can be completely engaged but by a simple arrangement can be effectively employed for strapping an object, such as a cylindrical object, that does not have such flat surface. Other objects will become apparent from a perusal of a more detailed description which follows.

Generally, the tool comprises a frame including a flat base which is provided with a support for one section of stationary non-actuatable strap. A strap shear is carried by the frame and is positioned over the strap support in spaced relationship thereto. Movably mounted on the frame is a strap gripper which can be moved between the support and the shear from a strap gripping position in cooperation with the support to a strap shearing position in cooperation with the shear and vice versa.

Actuating mechanism is provided for effecting the shearing including a single operating handle and means including a resilient element for urging the gripper toward the gripping position but which is movable by the handle to shearing position against the action of the resilient element. Such operating handle is connected to strap tightening or cinching means in the form of a windlass which when the handle is moved back and forth between certain positions effects tensioning and tightening of the strap. Means is provided on the handle, which is engageable with the gripper urging means to move the gripper towards shearing position when the handle is moved in one direction beyond a position at which such engagement occurs.

Thus, when one section of strap about an object is gripped between the strap support and the gripper, and a second section of the strap is positioned between the gripper and the shear and is connected to the windlass, the strap can be tightened by moving the single handle back and forth within predetermined limits. When tightened to the desired extent, it can be sealed by any suitable seal. After the sealing, moving the handle to the fullest extent in one direction results in release of the gripper from the gripping position with consequent release of the previously gripped strap section, and in automatic movement of the second section of strap against the shear to cut the same.

The above described mode of operation is for the strapping of an object having a surface upon which the base of the tool is in substantially complete engagement. For an object upon which the tool can not be completely engaged, such as a cylindrical object, a special arrangement is provided on the tool wherein the gripper is by-passed.

Description of Drawings

Referring to the drawings for a more detailed description of the invention,

FIG. 1 is an isometric view of the tool illustrating in relationship thereto means desirably in the form of a detachable attachment, adapting the tool for operation on an object, such as a cylindrical object, which does not have a surface upon which the tool can be completely engaged;

FIG. 2 is a side elevational view of the tool illustrating the manner of strapping about an object having a flat surface, such as a box or other prismatically shaped package, upon which the tool can be completely engaged, the operating handle being shown in phantom lines in one extreme position thereof to illustrate the back and forth movement of the handle;

FIG. 3 is a vertical transverse section taken in a plane indicated by the line 3—3 in FIG. 2;

FIG. 4 is a similar section taken in planes indicated by the line 4—4 in FIG. 2;

FIG. 5 is a longitudinal vertical section taken in a plane indicated by the line 5—5 in FIG. 4;

FIG. 6 is an exploded sectional view illustrating a desirable positioning means embodied in the tool for a special type of strap seal, and various steps in the placing of such seal about overlapped portions of strap to be sealed; it is to be understood that such means is not necessary for the tool hereof as any suitable seal can be employed;

FIG. 7 is a side elevational view similar to FIG. 2 illustrating the strap gripper and the operating handle in strap shearing position, and a portion of a crimping tool at its position for crimping the seal; portions of the object being shown broken away to shorten the view;

FIG. 8 is a transverse vertical section taken in a plane indicated by line 8—8 in FIG. 7;

FIG. 9 is a transverse vertical sectional-elevation taken in a plane indicated by the line 9—9 in FIG. 7 illustrating an initial position of a conventional type of crimping tool for crimping the seal;

FIG. 10 is a view similar to FIG. 9 illustrating the position of the tool when it has completed the seal crimping;

FIG. 11 is a fragmentary isometric view illustrating portions of overlapped sealed strap crimped together by the seal;

FIG. 12 is a fragmentary side elevational view illustrating how the tool is employed for binding an object having a non-flat surface such as a cylindrical object upon which the tool can not be completely engaged;

FIG. 13 is a vertical transverse section taken in a plane indicated by line 13—13 in FIG. 12;

FIG. 14 is a view similar to FIG. 4 illustrating a modification wherein an automatically releasable clutch is employed to obviate over-tightening of the strap which might otherwise result in breakage;

FIG. 15 is a transverse sectional elevation taken in a plane indicated by line 15—15 in FIG. 14.

General Organization

With particular reference to FIGS. 1 through 8, the general organization of the tool comprises an integral frame structure 2, desirably formed of a light metal casting, having a flat base 3 provided with a longitudinally extending support flange 4 for a section of strap, and with upstanding spaced apart front flange 6 and rear flange 6' which provide bracket means for supporting operating handle 7 and strap tightening member or windlass 8 which projects beyond front flange 6.

Fixedly mounted on front flange 6 and extending over strap support 4 in spaced relationship thereto is a shearing knife 9 having a relatively sharp shearing or cutting edge 11. Pivotally mounted on flange 6 for movement between support 4 and shear 9 is strap hold down clamp or gripper 12 which is rigidly connected to an arm structure 14 including an arm member 16 integral with gripper 12, an upwardly extending arm member 17 integral with member 16 and a longitudinally extending arm member 18 extending over rear flange 6'. Resilient means in the form of coil spring 19 is interposed between flange 6' and arm member 18 to urge gripper 12 continually to strap gripping position in cooperation with strap support 4.

Ratchet mechanism 21, shown best in FIG. 5, is connected between handle 7 and windlass 8 for effecting tightening of the strap when the handle is moved back and forth between the positional limits indicated by the arcuate arrow in FIG. 2. During such movement of the handle, one section 22 of the strap about object 23 and which is first positioned about the object is fixedly clamped by the gripper. The end portion of strap section extends over a sealing zone 24 on the tool which is located at one side of a shear 9 and gripper 12; and a second overlying section 26 of strap extends freely between gripper 12 and shearing knife 9 to windlass 8. Thus, as handle 7 is pumped or moved back and forth, tension is applied through section 26 of the strap to tighten the same about the object. When the strap has been completely tightened to the desired extent, a seal is crimped by a suitable crimping tool to clamp the two strap sections 22 and 26 together. After such crimping of the seal, when the handle is moved in a clockwise direction beyond the right hand position shown in FIG. 2 to the position shown in FIG. 7, gripper 12 is automatically elevated between support 4 and shear 9 to release strap section 22 and raise strap section 26 against the stationary non-actuatable shear to cut the leading end portion of the strap. The tool is then readily removed with the strap tightly cinched about object 23.

From the preceding, it is seen that the single handle 7 enables all operations of gripping, tensioning and shearing the strap. In this connection, a fixedly mounted hand grip 27 is provided at the location of sealing zone 24 to cooperate with handle 7 to enable both to be gripped by one hand as shown in FIG. 2 for effecting the shearing operation. Details of the aforementioned mechanism and other mechanism ancillary to and desirable for the tool will now be described.

*Handle Mount, Windlass, and Ratchet Mechanism*

Referring to FIGS. 1, 4 and 5, handle 7 is provided with a knob 31 at its outer end to facilitate grasping when the handle is pumped back and forth. The inner end of the handle is forked; the prongs 32 providing a space for accommodating ratchet wheel 33 and pawl 34 which is pivotally mounted on pin 36. Prongs 32 are journalled for rotation about a spindle or shaft 37 which is journalled for rotation in upright flanges 6 and 6'; shaft 37 being held by a nut 38 secured to one projecting end thereof. Carried by and projecting from the opposite end of shaft 37 is strap tightening windlass 8 having strap receiving slots 41. Ratchet wheel 33 is fixed for rotation with shaft 37 by a key 42; and a coil spring 43 interposed between pawl 34 and the solid portion 44 of handle 7 adjacent forks 32 thrusts tooth 46 of the pawl against the teeth of the ratchet wheel.

Pawl 34 has a lug 47 providing an accessible finger grasp projecting beyond the handle to provide for selective manual disengagement of the pawl from the ratchet wheel when this is desired for a purpose to be explained later. When the handle is moved back and forth, windlass 8 will be turned intermittently to cinch or tighten strap positioned in a slot 41 thereof.

For preventing reverse movement, a holding pawl 48 is provided which is pivoted on a pin 49 mounted between flanges 6 and 6', and a coil spring 51 urges tooth 52 of the holding pawl into continual engagement with the ratchet wheel teeth.

*Shear and Gripper Arrangement*

Referring particularly to FIGS. 1, 3 and 5, shear 9 is fixedly mounted on flange 6 in spaced relationship to strap support 4, by means of two pins 61 fixedly secured in flange 6, with a lock nut 62 about upper pin 61 interposed between the shear and the flange. Gripper 12 is slotted at 63 adjacent its rear end to provide forks 64 forming part of the aforementioned arm 16 connected to the gripper. These forks straddle the shear and are pivotally mounted on the lower pin 61 appearing in FIG. 5 whereby the gripper is movably mounted from gripping position to shearing position and vice versa.

For actuating the gripper against shearing edge 11 of shear 9, a lug 67 fixed to and extending laterally from the rear side of handle 7 is engageable with arm 18 connected to the gripper, to elevate gripper 12 against the action of spring 19 when handle 7 is moved beyond the position at which such engagement occurs to its fullest extent clockwise with reference to FIGS. 2 and 7. When the operator has tightened the strap about the object to the desired extent, the handle will generally be moved back to the left hand position shown in FIG. 2; and after the strap has been sealed at the sealing zone and it is desired to shear the same, movement of the handle in a clockwise direction would result in further tightening of the strap.

To obviate such further tightening when the strap is to be sheared, the operator can release pawl 34 from the ratchet by pressing finger grasp 47 with one hand against the action of spring 43 and holding the pawl disengaged. This enables the handle to be freely moved in a clockwise direction by the other hand to effect the shearing of strap section 26 with the other hand by gripping both the handle and the aforementioned hand grip 27.

Means is provided to effect a tight non-slippable grip between strap section 22 and the gripper support flange 4 in the gripping position of gripper 12. A slot 71 extends transversely inwardly from the front edge of support 4; and in the gripping position of gripper 12 which is of less width than the width of slot 71, the gripper is positioned in the slot as can be seen from FIGS. 1 and 2. Upwardly extending arm 17 connected to the gripper provides a stop against hand grip 27 in the gripping position. When strap section 22 is initially positioned to be gripped, the gripper is raised by the handle and then released. This results in bowing of the strap in slot 71 and gripping thereof between each side edge of the gripper and the adjacent side edge defining slot 71, thus effecting the tight grip which will not slip.

To facilitate shearing of strap section 26, gripper 12 is provided with an inwardly extending slot 72, and edge 73 defining slot 72 is substantially in line with and slidable against the face of the shear adjacent its shearing edge 11. Hence, slot edge 73 serves as a shear edge cooperable with the shear in the shearing operation.

The above described slotted gripping and shearing arrangement is particularly desirable for effecting a tight grip of the strap, especially flexible strap such as paper strap, and to effect efficient shearing. It is to be understood, however, that insofar as the general organization of the tool is concerned, the described slotted arrangement of the gripper and the strap support are not essential as any other suitable particular structure of the gripper and shear can be employed as long as the gripper is movable between the strap support and the shear between a strap gripping position and a shearing position, and vice versa.

Sealing Zone

As can be best seen from FIGS. 1 and 2, the base of the tool is formed with an opening 74 at sealing zone 24 to provide a free space for the sealing of overlying strap sections 22 and 26 after the strap has been cinched to the desired extent. The right hand side of said opening 74 is bounded by support leg 75 forming part of the flat base portion of the tool. Any type of sealing clip or clamp, of which there are many available, can be banded about strap sections 22 and 26 and crimped to such sections whereupon the final shearing can be effected in the manner previously related.

However, sealing zone opening 74 enables utilization of a special advantageous type of snap lock seal 76 in cooperation with a positioning bar 81 extending across the opening to facilitate sealing of the seal, and is desirably employed herein. Bar 81 is carried by the frame between leg 75 and flange 4, and forms an integral part of the frame; the top surface 82 thereof being substantially flush with the top surface of leg 75 and flange 4. Rearwardly of bar 81, upright shoulders 83 are formed to provide abutments for the rear edges of overlying strap sections 22 and 26 to position them. The width of bar 81 is narrower than the strap. Hence, when the strap sections are positioned on the tool they overhang both the front and rear sides of the bar. A chamfer 84, desirably having a concave curvature, is advantageously provided along the upper front edge of the bar to provide a free space between the supported strap sections and the bar, as can be seen best from FIGS. 6 and 9, for reasons to be explained.

Special seal 76 preferably employed in cooperation with the positioning bar is disclosed in detail and claimed in our copending application for "Strap Banding Seal and Strapping Method," filed June 27, 1960, Serial No. 39,090 and now abandoned. Briefly, it is formed of an integral strip of resilient sheet metal, such as steel, folded along an arcuate hinge connection line 86 to form two overlying strap clamping plates 87 and 88. An integral outwardly extending tongue 89 is formed along the free edge of plate 87, and an integral inwardly extending flange 91 is formed along the free edge of plate 88. Flange 91 is longer than tongue 89, and is formed with an integral reentrant lip 92 along its free edge to provide a groove 93 for snap lock connection with tongue 89 when the clamping plates 87 and 88 are pressed together. In the unused condition of the seal, namely, before it is used for sealing the strap section together, clamping plates 87 and 88 are angularly related to provide an open gap 94 for facilitating positioning of the seal over the overlapped strapped portions.

Seal 76 can be placed about strap sections 22 and 26 which rest upon positioning bar 81, either before or after the tool has been operated to tension the strap, but desirably after. When the strap has been tensioned, the tool may be released and the tension will be maintained because of holding pawl 48.

The seal is then manually slipped over overlapped strap sections 22 and 26 which find full support on positioning bar 81, by manually moving the same laterally with plate 87 facing downwardly to cause strap sections 22 and 26 to pass through gap 94 and plate 87 to pass between the overlying strap sections and bar 81. During such seal positioning, chamfer 84 provides a camming surface to guide seal plate 87 between the positioning bar and the strap sections; and the space formed by chamfer 84 between the strap sections and bar 81, provides room to facilitate insertion of the seal.

After the seal has been initially positioned, it is shoved along hinge connection 86 until the hinge connection engages the edges of the strap with tongue 89 and flange 91 extending beyond the rear face of the positioning bar. Downward manual pressure on clamping plate 88 effects the snap lock connected between locking tongue 89 and locking groove 93. In this connection, seal positioning bar 81 provides a firm support during such snap locking of the seal.

When the seal has been snap locked, it forms a relatively loose banding tube about the strap sections 22 and 26; and a conventional crimping tool 96 is employed to crimp and seal the clamping plates of the seal tightly onto the strap sections. With reference to FIGS. 9 and 10, crimping tool 96 has cooperating pivotally mounted laterally movable jaws 97 which are actuated by a suitable linkage connection by handles (not shown) secured in the usual sockets 98.

Chamfer 84 of positioning bar 81 not only provides a camming surface for the seal but also for facilitating and guiding entrance of the left hand jaws appearing in FIG. 9, between positioning bar 81 and the banded strap sections. This results in lifting of the banded portion of the strap sections from the positioning bar when the jaws are brought together for crimping, as can be seen by comparison of FIG. 10 with FIG. 9. Desirably, the crimping tool is of the type which forms transversely extending corrugations 99 (FIG. 11) in the seal, as this obviates mutilations of the side edges of the strap which might otherwise occur.

Object Adapter Structure

The described tool is relatively small in size, being not more than about five to seven inches long and about two and one quarter to three inches in width. In many banding operations, the objects to be strapped, such as packages and paperboard cartons containing contents, have at least one flat surface of sufficiently large area upon which the flat base of the tool can be substantially completely engaged with full support and without overhang, as is illustrated in FIGS. 2 and 7. If such sufficiently large flat surface is not present on the object, this would result in overhang of the tool when the tool is supported thereon.

As a result, after the strap is tightened, sealed and sheared in the manner described, the strap will lose its tight binding about the object because of slack resulting from the overhang, which will immediately occur when the tool is slipped from under the tightened strap upon removal of the tool. Means is provided on the tool which may be a permanent part thereof but which is desirably a detachable attachment enabling the tool to be employed also for the banding of objects that do not have the requisite flat surface of sufficiently large area, or for non-flat sided objects, such as cylindrical objects.

Referring particularly to FIGS. 1, 12 and 13, such means comprises a bar or leg 101 provided with a laterally extending lug 102 adapted to seat in a recess 103 in the underside of the tool base and to be rigidly attached thereto by a detachable cap screw secured in threaded hole 104 in the base and similar hole 106 in lug 102, with a side of the bar in rigid abutment against hand grip 27 and leg 75. Leg 101 is provided with a horizontal slot 107 extending inwardly from the front end thereof. The inner portion of the leg below the slot is cut away to provide a strap receiving space 108 between leg 75 and bar 101.

A strap positioning bar 109 similar in contour to previously described positioning bar 81, extends outwardly in a transverse direction from leg 101 and is integrally carried by the leg below slot 107 with its upper surface 110 substantially flush with the lower surface defining slot 107. Bar 109 is of relatively short length being just sufficient to facilitate formation of a strap loop. A suitable length is about one inch which is substantially equal to the length of the seal employed for crimping the strap. Slot 107 extends slightly beyond the rear face of bar 109 so that when strap is looped about the bar in the manner shown in FIG. 12, it overhangs the rear face of the bar as the rear of the slot provides a stop.

When strapping an object such as a cylindrical object 111 shown in FIG. 12, an end portion 112 of the strap is positioned between the object and bar 109, and the tool is supported on the object with leg 101 of the tool end gripping strap portion 112 which is also gripped by bar 109. While supporting the tool with one hand, the strap is wound with a reverse turn about bar 109 and passed through slot 107, through space 108 between leg 101 and leg 75, and manually wound about object 111, and again over bar 109 and through slot 107 with a portion 113 of the strap extending to one side of slot 107 over leg 75 to windlass 8 where it is connected in a slot 41 thereof.

This results in a second portion 114 and an overlying third portion 115 of the strap at the opposite side of slot 107 resting on the bar and with the formation of a seal receiving loop between overlying strap portion 114 and end strap portion 112. In this procedure, end portion 113 of the strap by-passes the gripping means 4, 12 but is extended between shear 9 and gripper 12.

Before the strap is completely tensioned by moving handle 7 back and forth, the seal 76 is positioned about overlying strap portions 114 and 115 in the manner described with reference to positioning bar 81 with its clamping plate 87 between positioning bar 109 and overlying strap portions 114 and 115, and is pressed against the bar to snap lock the same. With the seal 76 thus loosely banded about strap portions 114 and 115, the strap is tightened to the desired extent by moving handle 7 in the manner previously described. After the strap tightening operation, the tool remains tightly held and supported against the object under the tension of the strap.

Overlying strap portions 114 and 115 are then sealed to the seal by crimping the same by the crimping tool; and after the crimping, shearing of portion 113 of the strap is effected in the manner described previously. Finally, the tool is slipped out from under the strap. During this entire procedure, gripping of the strap is effected by leg 101 and also bar 109 clamping end portion 112 of the strap against the object.

Slot 107 performs the important purpose of holding strap portions 114 and 115 together to facilitate placing of the seal about such portions. In this connection, any other type of tube-like seal can be employed and positioning bar 109 can be omitted. In such event, the end of the tool adjacent slot 107 can serve as the sole gripping means for strap portion 112, and the seal can be positioned over overlying strap portions 114 and 115 to maintain the loop with the seal abutting the tool end. However, bar 109 is desirable because it cooperates in maintaining the loop during the strapping procedure. It is preferred to provide leg 101 as a detachable attachment because it can be removed when not in use. However, the described arrangement can be made an integral part of the tool. For example, slot 107 and the strap receiving space 108 can be formed directly in leg 75, and also bar 109 can be carried by leg 75.

Automatic Releasable Clutch Mechanism

Under some circumstances, when the tool is employed for either of the described strapping methods, a careless workman might apply too much tension to the strap and thus break the same. FIGS. 14 and 15 illustrate a modification which comprises an automatically releasable clutch operatively connected between windlass 8 and ratchet mechanism 21 to obviate over-tightening of the strap. The parts in FIGS. 14 and 15 which are the same as those previously described are given the same reference numerals.

Shaft 37 which carries windlass 8 is journalled for rotation in flange 6; and sleeve 116 is journalled about shaft 37 and also in flange 6' and projects beyond flange 6'. Ratchet wheel 33 is keyed for rotation to sleeve 116 by key 117; and pawl 34 is spring thrust against the ratchet wheel in the manner previously described. Thus, when the handle 7 is moved back and forth, the sleeve is intermittently moved.

Means is provided for transmitting a drive from sleeve 116 to shaft 37 comprising a driving clutch plate 118 fixedly secured to the sleeve and having a plurality of circumferentially arranged apertures 119 therein. A driven clutch plate 121 is fixed for rotation with shaft 37 but is slidable axially therealong by means of flats 122 formed on the end of shaft 37 and which fit into complementary flats in driven clutch plate 121. Such driven clutch plate is provided with a plurality of circumferentially arranged apertures of slightly larger size than apertures 119 and which seat freely rotatable ball bearings 123 of a diameter greater than the thickness of clutch plate 121 whereby the bearings project beyond the faces of clutch plate 121; the number of apertures 119 in clutch plate 118 being preferably more than the number of ball bearings 123 in plate 121.

A pressure plate 124 is slidably mounted on an extension 126 of shaft 37, and is spring pressed against the ball bearings by a coil spring 127 about extension 126, the compression on which is adjustable by a pair of nuts 128 screwed on shaft extension 126; spring seating washers 129 being positioned at the ends of spring 127.

With a predetermined amount of compression placed on spring 127 by adjustment of nuts 128, pressure plate 124 maintains balls 123 in driving engagement with driving clutch plate 118 by seating in apertures 119, to effect a drive to the windlass when the handle 7 is moved back and forth. If the tension imparted to the strap exceeds a predetermined amount beyond the compression exerted by spring 127, the clutch will slip, thus precluding breakage of the strap. By adjusting the spring compression in the manner described, one can readily preadjust the mechanism to release at the proper time for the particular type of strap being tightened.

We claim:

1. A strapping and shearing tool comprising a frame having a support for strap or the like wound about an object, a substantially stationary non-actuatable strap shear carried by said frame and spaced from said support, a strap gripper mounted on said frame for movement between said support and said shear from a strap gripping position in cooperation with said support to a strap shearing position in cooperation with said shear and vice versa, means including a resilient element interposed between said gripper and said frame for urging said gripper toward said gripping position, a strap tightening member carried by a shaft journalled on said frame, a single handle journalled about said shaft, pawl and ratchet mechanism between the handle and the shaft for effecting tightening of the strap when the handle is moved back and forth, and means on said handle engageable with said urging means to move the gripper toward said shearing position against the action of said resilient element when the handle is moved in one direction beyond a position at which such engagement occurs.

2. The tool of claim 1 wherein automatically releasable clutch mechanism is operatively connected between said shaft and the pawl and ratchet mechanism to obviate overtightening of the strap.

3. A strapping and shearing tool comprising a frame having a support for strap or the like wound about an object, a substantially stationary non-actuatable strap shear carried by said frame and spaced from said support, and a strap gripper mounted on said frame for movement between said support and said shear from a strap gripping position in cooperation with said support to a strap shearing position in cooperation with said shear and vice versa, means including a resilient element interposed between said gripper and said frame for urging said gripper toward said gripping position, a strap tightening member carried by a shaft journalled on said frame, a single handle journalled about said shaft, pawl and ratchet mechanism between the handle and the shaft for effecting tightening of the strap when the handle is moved back and forth, and means on said handle engageable with said urging means to move the gripper toward said shearing position against the action of said resilient element when the handle is moved in one direction beyond a position at which such engagement occurs, the pawl of said pawl and ratchet mechanism being movably mounted on said handle and having an accessible lug projecting beyond the handle to enable selective manual disengagement of the pawl from the ratchet whereby the handle can be moved to effect the strap shearing without substantial tightening of the strap.

4. A strapping and shearing tool comprising a frame having a support for strap or the like wound about an object, a substantially stationary non-actuatable strap shear carried by said frame and spaced from said support, and a strap gripper mounted on said frame for movement between said support and said shear from a strap gripping position in cooperation with said support to a strap shearing position in cooperation with said shear and vice versa, means including a resilient element interposed between said gripper and said frame for urging said gripper toward said gripping position, a strap tightening member carried by a shaft journalled on said frame, a single handle journalled about said shaft, pawl and ratchet mechanism between the handle and the shaft for effecting tightening of the strap when the handle is moved back and forth, means on said handle engageable with said urging means to move the gripper toward said shearing position against the action of said resilient element when the handle is moved in one direction beyond a position at which such engagement occurs, the pawl of said pawl and ratchet mechanism being movably mounted on said handle and having an accessible lug projecting beyond the handle to enable selective manual disengagement of the pawl from the ratchet whereby the handle can be moved to effect the strap shearing without substantial tightening of the strap, and a hand grip carried by said frame enabling the handle and hand grip to be grasped with one hand for effecting shearing of the strap.

5. A strapping and shearing tool comprising a frame having a non-actuatable strap or the like support, a strap shear fixedly carried by said frame and spaced from said support, a strap gripper pivotally mounted on said frame for movement between said support and said shear from a strap gripping position in cooperation with said support to a strap shearing position in cooperation with said shear and vice versa, an arm structure connected to said gripper, spring means interposed between said arm structure and said frame for urging the gripper toward strap gripping position; strap tightening mechanism mounted on said frame including a windlass, a single handle and pawl and ratchet means between the handle and the windlass for tightening the strap when the handle is moved back and forth; and means on said single handle engageable with said arm structure to move the gripper toward said shearing position against the action of said resilient means when the handle is moved in one direction beyond a position at which such engagement occurs.

6. The tool of claim 5 wherein said support has a slot extending inwardly from an edge thereof, and the gripper in its gripping position grips the strap between each side edge thereof and the adjacent side edge of the support defining said slot.

7. The tool of claim 5 wherein said support has a slot extending inwardly from an edge thereof, the gripper in its gripping position grips the strap between each side edge thereof and the adjacent side edge of the support defining said slot, and said gripper has an inwardly extending slot, an edge defining said gripper slot providing a shear edge cooperable with said shear when the gripper is moved to shearing position.

8. A strapping and shearing tool comprising a frame having a base adapted to rest on an object and which has a strap sealing zone, a support forming part of said base for strap or the like wound about an object, a substantially stationary non-actuatable strap shear carried by said frame adjacent one side of said sealing zone and spaced from said support, a strap gripper mounted on said frame adjacent said one side of said sealing zone for movement between said support and said shear from a strap gripping position in cooperation with said support to a strap shearing position in cooperation with said shear and vice versa, means including a resilient element interposed between said gripper and said frame urging said gripper toward said gripping position, a single actuating handle pivotally supported by said frame at said one side of said sealing zone for back and forth movement, means carried by said frame and actuated by said handle for tightening strap when the handle is moved back and forth, additional means carried by said frame and actuated by said handle for moving the gripper from said gripping position to said strap shearing position against the action of said urging means when the handle is moved in one direction beyond a predetermined position, and a hand grip carried by said frame at the location of said sealing zone cooperable with said handle to effect shearing of said strap.

9. The tool of claim 8 wherein said base carries a leg adjacent one end thereof having a slot extending inwardly from an end of said leg for receiving overlapped portions of strap in the binding of an object having a surface upon which the base can not be substantially completely engaged.

References Cited in the file of this patent

UNITED STATES PATENTS

| 1,149,569 | Flora | Aug. 10, 1915 |
| 1,386,098 | Flora | Aug. 2, 1921 |
| 1,833,168 | MacChesney et al. | Nov. 24, 1931 |
| 2,072,566 | Perrelet | Mar. 2, 1937 |
| 2,080,329 | Mortimer | May 11, 1937 |
| 2,097,945 | Childress | Nov. 2, 1937 |
| 2,283,827 | Spencer | May 19, 1942 |
| 2,622,460 | Keeble | Dec. 23, 1952 |
| 2,643,857 | Reece et al. | June 30, 1953 |
| 2,779,566 | Keeble | Jan. 29, 1957 |
| 2,797,714 | MacChesney | July 2, 1957 |

FOREIGN PATENTS

| 462,161 | Great Britain | Mar. 3, 1937 |
| 936,016 | Germany | July 8, 1949 |